United States Patent
Inoue

[19]

[11] Patent Number: 6,125,816

[45] Date of Patent: Oct. 3, 2000

[54] CYLINDER INJECTION SYSTEM ENGINE

[75] Inventor: Hiroaki Inoue, Shizuoka-ken, Japan

[73] Assignee: Suzuki Motor Corporation, Shizuoka-ken, Japan

[21] Appl. No.: 09/144,049

[22] Filed: Aug. 31, 1998

[30] Foreign Application Priority Data

Sep. 1, 1997 [JP] Japan .................................. 9-251302

[51] Int. Cl.⁷ ............................ F02D 41/34; F02B 17/00
[52] U.S. Cl. ........................................... 123/299; 123/295
[58] Field of Search .................................. 123/295, 299, 123/300, 305, 478, 490, 492

[56] References Cited

U.S. PATENT DOCUMENTS

| | | | |
|---|---|---|---|
| 3,575,146 | 4/1971 | Creighton et al. ..................... | 123/299 |
| 3,626,910 | 12/1971 | Porsche et al. ........................ | 123/483 |
| 4,535,743 | 8/1985 | Igashira et al. ...................... | 123/478 X |
| 4,561,405 | 12/1985 | Simons ................................. | 123/478 X |
| 4,754,735 | 7/1988 | Simons ................................. | 123/478 |
| 5,313,920 | 5/1994 | Matsushita ............................ | 123/295 |
| 5,331,933 | 7/1994 | Matsushita ............................ | 123/295 |
| 5,666,916 | 9/1997 | Fujieda et al. ....................... | 123/295 |
| 5,713,328 | 2/1998 | Anderson et al. ..................... | 123/299 |

FOREIGN PATENT DOCUMENTS

| | | |
|---|---|---|
| 5-71350 | 3/1993 | Japan . |
| 7-119507 | 5/1995 | Japan . |
| 9-32619 | 2/1997 | Japan . |
| 1149073 | 4/1969 | United Kingdom . |

*Primary Examiner*—Tony M. Argenbright
*Attorney, Agent, or Firm*—Flynn, Thiel, Boutell & Tanis, P.C.

[57] ABSTRACT

A cylinder injection system for an engine includes an injector for injecting fuel directly into a combustion chamber which is formed in the engine by a cylinder blocks, a cylinder head, and a piston. The system includes a control unit for controlling injection timing of fuel from the injector, and the control unit is configured for dividing the injection timing into several separated subtimes of injection according to the predetermined conditions of the engine.

3 Claims, 4 Drawing Sheets

SINGLE TIME OF INJECTION

SEPARATED INJECTIONS

CYLINDER INJECTION SYSTEM ENGINE

FIELD OF THE INVENTION

This invention relates to a cylinder injection system for a combustion engine. More particularly, the invention relates to a cylinder injection system engine having a control means provided with an additional feature for causing injection timing of fuel from an injector to be divided into several times of injection timing according to predetermined conditions of the engine, and whereby accelerated atomization provides a shorter injection period, with a consequential increase in fuel economy.

BACKGROUND OF THE INVENTION

In internal combustion engines, there is a cylinder injection system designed to cause an injector to inject fuel directly into a combustion chamber. The chamber is formed by a cylinder block, a cylinder head, and a piston.

In recent years, many proposals have been made to a gasoline engine of a direct cylinder injection type to force the fuel directly into a cylinder (for example, see published Japanese Laid-Open Patent Application No. 5-71350).

In most of these gasoline engines, the following steps are provided during low load engine operation: fuel is blown into a piston cavity during engine compression strokes, the piston cavity being a concave portion that is provided on a top surface of a piston; fuel is gathered near spark plugs; an air-fuel mixture is stratified, whereby the engine is entirely operated with a lean air-fuel ratio so as to provide a considerable improvement in fuel efficiency. Meanwhile, different steps are provided during high load engine operation: fuel is injected into a cylinder during intake strokes, thereby producing a uniform air-fuel mixture in the cylinder; and the engine is operated with either a theoretical or richer air-fuel ratio. The engine is characterized in that the angle of injected fuel spray as well as the distance for atomization varies with fluctuations in the internal pressure of the cylinder due to a change in injection timing for swirl type injections. With further reference to such a variation, when the internal cylinder pressure is lower, then the spray angle is smaller, while the distance of atomization is longer. In a converse case, the spray angle is greater, but the distance of atomization is shorter. Most of the presently proposed direct cylinder injection engines with externally supplied ignition are of this type.

In addition, a high level of fuel pressure (e.g., 5 MPa or greater) is retained in order to atomize the fuel spray. Five MPa is equal to 50,000 hPa, which is some fifty times as great as atmospheric pressure because atmospheric pressure is about 1,013 hPa.

One example of a cylinder injection system engine is disclosed in published Japanese Laid-Open Patent Application No. 5-118244. The internal combustion engine disclosed therein performs fuel injection by dividing requested fuel injection quantity according to intake and compression strokes. In this engine, one fuel injection quantity for each intake stroke is determined by the requested fuel injection quantity being multiplied by a partition factor. Another fuel injection quantity for each compression stroke is determined by the above determined injection quantity being subtracted from the requested fuel injection quantity. In this way, the engine is designed to insure satisfactory combustion.

Another example is disclosed in published Japanese Laid-Open Patent Application No. 5-118245. The internal combustion engine disclosed therein performs fuel injection by dividing requested fuel injection quantity according to intake and compression strokes. In this engine, one fuel injection quantity for each intake stroke is determined by the requested fuel injection quantity being multiplied by a partition factor that is based on the internal pressure of a cylinder. Another fuel injection quantity for each compression stroke is determined by the above determined injection quantity being subtracted from the requested fuel injection quantity. The engine thereby reliably provides satisfactory combustion.

A further example is disclosed in published Japanese Laid-Open Patent Application No. 7-119507. The cylinder injection system of a spark ignition engine disclosed in '507 includes a fuel injection valve that starts fuel injection during each intake stroke in an engine-operating state in which uniform combustion is executed. In this engine, in order to provide fuel injection, a required amount of fuel is divided a number of times during at least low engine rotational speed in an engine operating state. As a result, smoke is prevented from occurring during the uniform combustion.

A still further example is disclosed in published Japanese Laid-Open Patent Application No. 9-32619. The cylinder injection system of an internal combustion engine disclosed in '619 includes a fuel injection valve for injecting fuel directly into a combustion chamber of the engine, thereby effecting lean combustion operation with an air-fuel ratio greater than a theoretical air-fuel ratio. The engine is characterized by: an exhaust passage for discharging exhaust gases from the combustion chamber; a lean NOx catalyst disposed in the exhaust passage for absorbing nitrogen oxides (NOx) in the exhaust gases during the lean combustion operation; an operating state-detecting means for detecting how the engine is running; and a fuel injection valve control means for supplying the lean NOx catalyst with additional fuel by actuating the fuel injection valve during each exhaust stroke of the engine based on the above detection result from the operating state-detecting means. As a result, materials absorbingly adhered to the lean NOx catalyst, which materials contribute to a reduction in purification capability, are eliminated securely and properly without torque fluctuations being involved.

In the compression stroke injection of conventional cylinder injection system engines, fuel injection timing from an injector must be retarded as much as possible in order to ensure that fuel is trapped in a piston cavity. The cavity has a concave shape, and is formed on the upper surface of the piston.

In order to ensure that the spark plugs ignite the air-fuel mixture, the fuel injected from the injector must be reliably atomized at the very moment of such ignition ("a combustion setup period"). In order to insure the combustion setup period, the injection timing of fuel from the injector must be advanced as much as possible.

In particular, the injection period and the combustion setup period with reference to a crank angle of the crankshaft increases with an increase in engine rotational speed and load (within a range of the compression stroke injection). Thus, it is difficult to satisfy the aforesaid two requirements at a single time, and consequently there has been a continuing desire to overcome such difficulty.

Further, in the compression stroke injection of the cylinder injection system engine, the injection period with reference to the crank angle is made longer with elevated engine rotational speed and load. This causes an inconvenience in that a sufficient period of time required for fuel atomization cannot be guaranteed, which is a disadvantage in practical use.

SUMMARY OF THE INVENTION

In order to obviate or minimize the above drawbacks and difficulties, the present invention provides an engine having a cylinder injection system, including an injector for injecting fuel directly into a combustion chamber, the chamber being formed in the engine by a cylinder block, a cylinder head, and a piston, and further including control means for controlling injection timing of fuel from the injector, wherein the control means is configured with an additional feature for causing the injection timing to be divided into several times of injection timing according to predetermined conditions of the engine.

Pursuant to the invention having the above structure, the control means alters the fuel injection timing of the injector by dividing the timing into several injection times according to the predetermined conditions of the engine. Further, accelerated atomization provides a shorter injection period, with a consequential increase in a fuel economy.

BRIEF DESCRIPTION OF THE DRAWINGS

An embodiment of the present invention will now be described in detail with reference to the drawings wherein.

DETAILED DESCRIPTION

FIGS. 1–10 illustrate an embodiment of the present invention.

Figure 2:
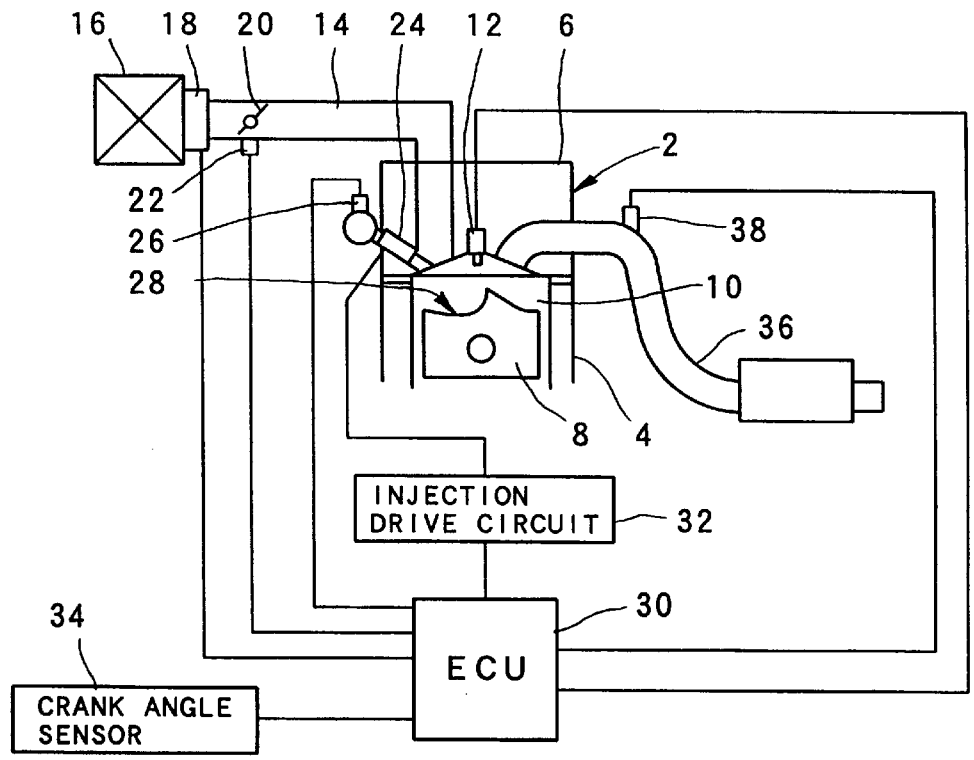
FIG. 2 is a schematic structural diagram illustrating the cylinder injection system engine.
Figure 3:
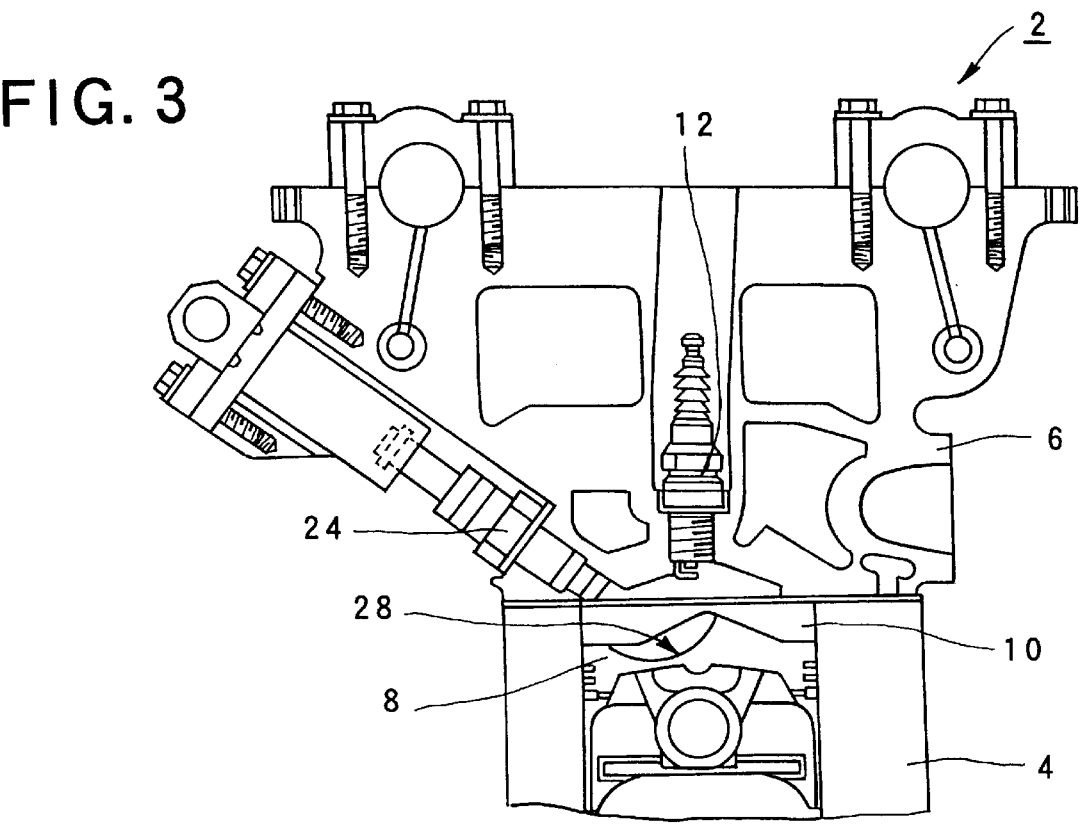
FIG. 3 is an enlarged view showing an essential portion of the engine around a combustion chamber.

In FIGS. 2 and 3, reference numeral 2 denotes an engine including a cylinder injection system. The engine 2 has a combustion chamber 10 formed by a cylinder block 4, a cylinder head 6, and a piston 8. In addition, a spark plug 12 is positioned on the top of the chamber 10 at a central portion thereof. An air intake passage 14 is provided in the engine 2 for communicating with the combustion chamber 10. In addition, the following components are arranged in sequence from the upstream side of the intake passage 14: an air cleaner 16; an air flow meter 18; and a throttle valve 20. The throttle valve 20 is provided with a throttle position sensor 22 for detecting a throttle opening of the valve 20.

Moreover, a fuel injector 24 is disposed for communication with the combustion chamber 10. In this case, the injector 24 is positioned in a state of being directed toward the chamber 10, e.g., facing toward a central portion of the chamber 10 and in a slightly downward direction in order to inject fuel directly into the combustion chamber 10. The injector 24 is provided with a fuel pressure sensor 26 for detecting fuel pressure.

Further, the piston 8 has a piston cavity 28 provided on an upper surface or top surface thereof. The cavity 28 is of a concave shape.

The engine 2 includes control means 30 for controlling injection timing of fuel from the injector 24. The control means (ECU) is an electronic circuit, electronic control unit, integrated circuit, or any other suitable decision making control unit. The control means 30 is connected, e.g. electrically, to the following: the spark plug 12; the air flow meter 18; the throttle position sensor 22; the fuel pressure sensor 26; an injector drive circuit 32 for driving the injector 24; a crank angle sensor 34 for detecting a crank angle of a crankshaft (not shown); and an A/F sensor 38 for detecting an air-fuel ratio (A/F) inside an exhaust passage 36 of the engine 2.

In the engine 2, the control means 30 is configured (i.e., provided with a feature) for causing the above-mentioned injection timing to be divided into several injection times according to predetermined conditions of the engine 2, such as, e.g., engine rotational speed, an intake flow rate, and an engine load calculated from the throttle opening; or stated another way, according to any of the engine sensors connected to the control means. The injection time is thus divided into injection subtimes each being less than the original injection time.

In further detail, the control means 30 executes control so as to provide such separated (divided) injection timing as above during a high engine rotational speed or a high engine load during compression stroke injection. The control means 30 further performs control so as to provide the separated (divided) injection timing during a high engine rotational speed or a high engine load during intake stroke injection.

More specifically, the control means 30 initially determines an operating state of the engine 2 based on output signals from various sensors such as the air flow meter 18, the throttle position sensor 22, the crank angle sensor 34, and the like. Then, when the operating state is determined to be within zones of a low rotational speed and a low load (i.e., regions 1 and 3 in FIGS. 4 and 5), then the control means 30 permits the fuel to be injected into the piston cavity 28 during each compression stroke, thereby resulting in stratified fuel. When the operating state of the engine 2 is determined to be within zones of a high rotational speed and a high load (regions 2 and 4 in FIGS. 4 and 5), then the control means 30 causes the fuel to be injected into the piston cavity 28 during each intake stroke, thereby equalizing an air-fuel mixture.

Figure 6:
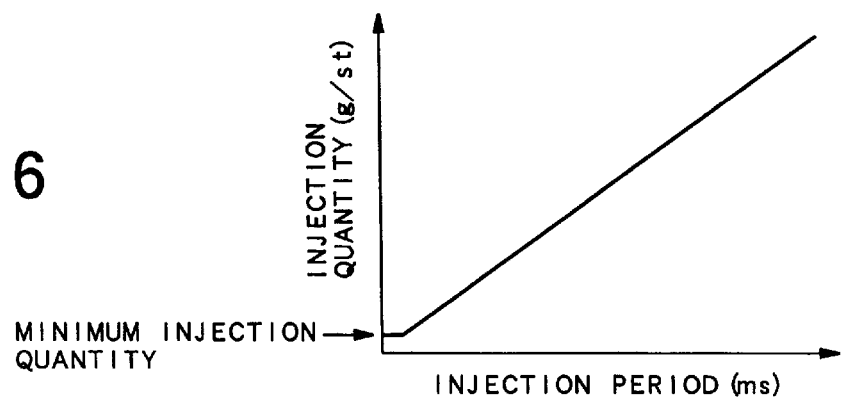
FIG. 6 is a view showing a relationship between an injection period (ms) and an injection quantity (g/st) of an injector.

FIG. 6 shows a relationship between an injection period (ms) and an injection quantity (g/st) of the injector 24. As shown in FIG. 6, these two elements establish a substantially linear relationship, or a substantially proportional relationship. Since the fuel corresponding in amount to intake air for each cylinder is injected for a substantially constant period of time, then a crank angle corresponding to such injection time increases with an increase in the rotational speed. In addition, since an increased load brings about an increased amount of fuel and a longer injection time, then the crank angle corresponding to the injection time is again increased.

Figure 7:
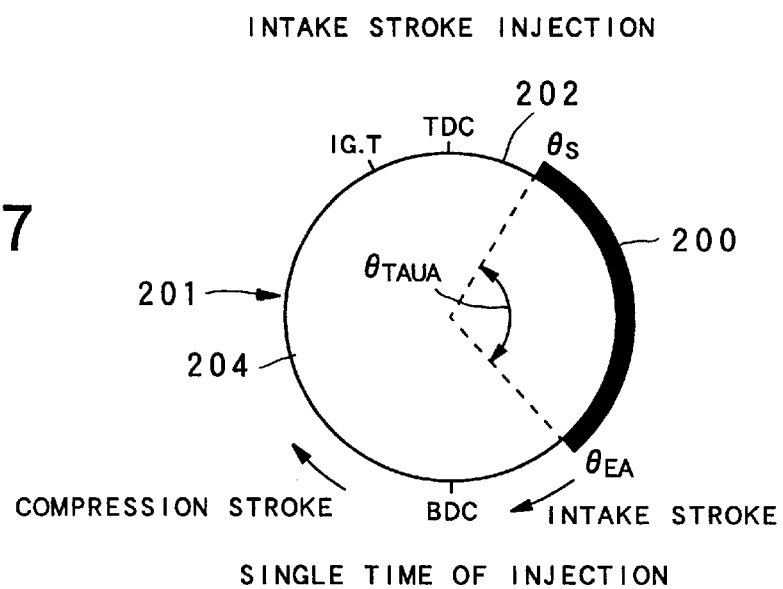
FIG. 7 shows an intake stroke injection having a single time of injection.
Figure 8:
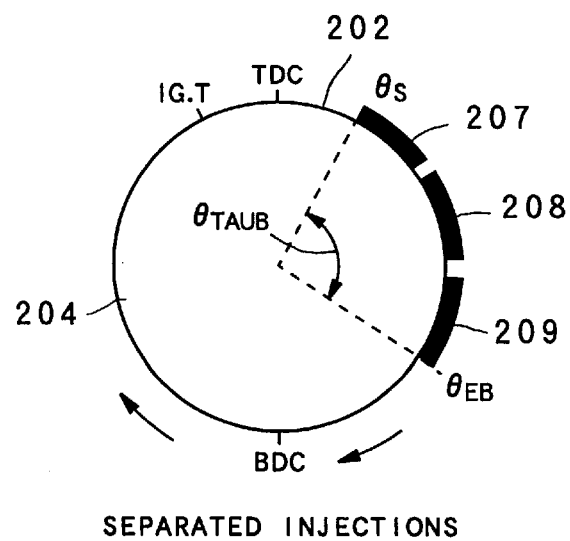
FIG. 8 shows an intake stroke injection having separated injections.

However, as illustrated in FIGS. 7, 8 and 9, 10, when the fuel injection timing or period is divided into at least two injection times (i.e. subtimes), then a water hammer effect caused by the first injection (or, the previous injection when the fuel has been injected several times) produces a dynamic effect that involves a rise in pressure surrounding the nozzle of the injector 24. This dynamic effect increases (or may decrease) the rate of the remaining fuel injection. Now, assume that one total injection period for a single time of injection and another for the separated injections are "θ TAUA" and "θ TAUB", respectively, as illustrated in FIGS. 7 and 8. Then, the following relationship is established:

$$\theta TAUA > \theta TAUB$$

In this way, a shorter total injection period is achievable by dividing the injection time into several separated subtimes.

Figure 9:
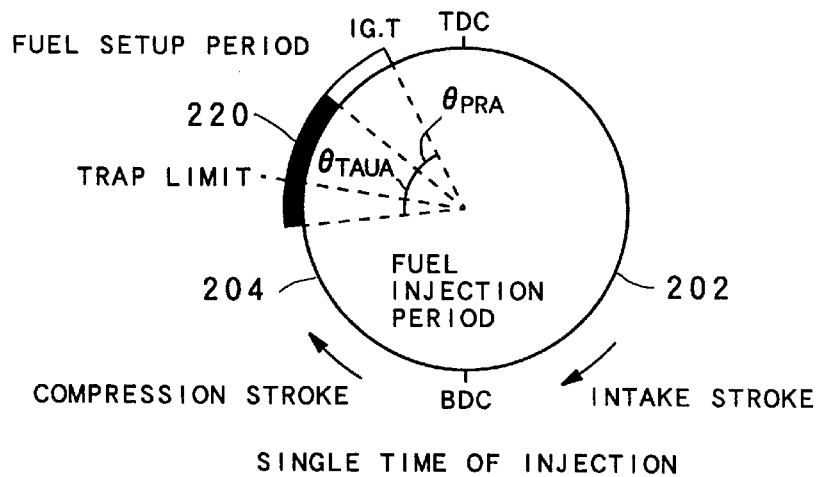
FIG. 9 shows a compression stroke injection having a single time of injection.
Figure 10:
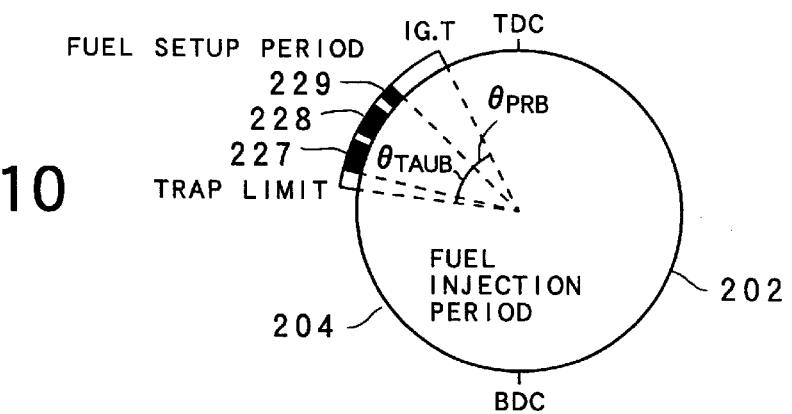
FIG. 10 shows a compression stroke injection having separated injections.

In addition, since the fuel injection is executed separately at several times, then the fuel is fed into a cylinder at given time intervals. Accordingly, the intake air and fuel are well mixed together, thereby promoting fuel atomization. Now, assume that one total fuel setup period for a single time of injection and another for the separated injections are "θ PRA" and "θ PRB", respectively (FIGS. 9 and 10). Then, the following relationship is established:

$$\theta PRA > \theta PRB$$

Thus, a shorter total fuel setup period is obtainable for injection subtimes.

Figure 4:
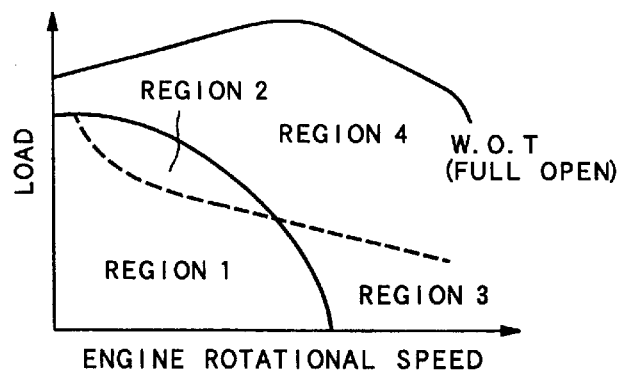
FIG. 4 is a view showing a region covering a first pattern.
Figure 5:
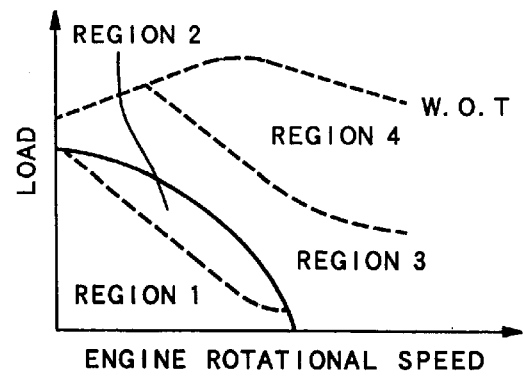
FIG. 5 is a view showing a region covering a second pattern.

In regions 3 and 4 of FIGS. 4 and 5 in which shorter injection periods are desired, the control means 30 provides control so as to divide the fuel injection timing from the injector 24 into several injection times, i.e. subtimes. Note that region 3 shows one separated injection region in the compression stroke injection, while region 4 indicates another in the intake stroke injection.

FIG. 7 shows the fuel injection time period 200 as an angle measurement relative to the circular path 201 of the crankshaft (not shown) for an intake stroke injection. The fuel injection time period 200 has a single continuous injection lasting the entire injection angle, that is θ S to θ EA which is θ TAUA. In FIG. 7, the fuel injection occurs during the intake stroke that is the right half 202 of path 201 between top dead center TDC and bottom dead center BDC of crankshaft path 201. For ease of illustration, the fuel injection time 200 has a wide line representation along a portion of the intake stroke 202. The compression stroke 204 is the left half of the path 201. The fuel ignition timing is indicated at "IG.T".

FIG. 8 shows intake stroke injection as shown in FIG. 7 but with the fuel injection time divided into three injection subtimes 207, 208, 209 during the intake stroke 202 between crankshaft angles θ S and θ EB according to the present invention. The difference between θ S and θ EB is θ TAUB. Each of the subtimes 207, 208, 209 is separated from the adjacent subtime by an interval of no fuel injection. The sum of the three subtimes 207, 208, 209 is less than the injection time through θ TAUA.

FIG. 9 shows the fuel injection time period 220 occurring during the compression stroke 204. The compression stroke injection time period 220 is a single continuous injection through θ TAUA followed by a fuel setup period θ PRA. The fuel ignition 203 occurs at the end of the fuel setup period.

FIG. 10 shows the fuel intake time for a compression stroke injection which is divided into three subtimes 227, 228, 229 occurring through θ TAUB. The three subtimes 227, 228, 229 are separated by periods of no injection. The sum of the three subtimes 227, 228, 229 is less than the continuous injection time period 220 through θ TAUA.

Figure 1:
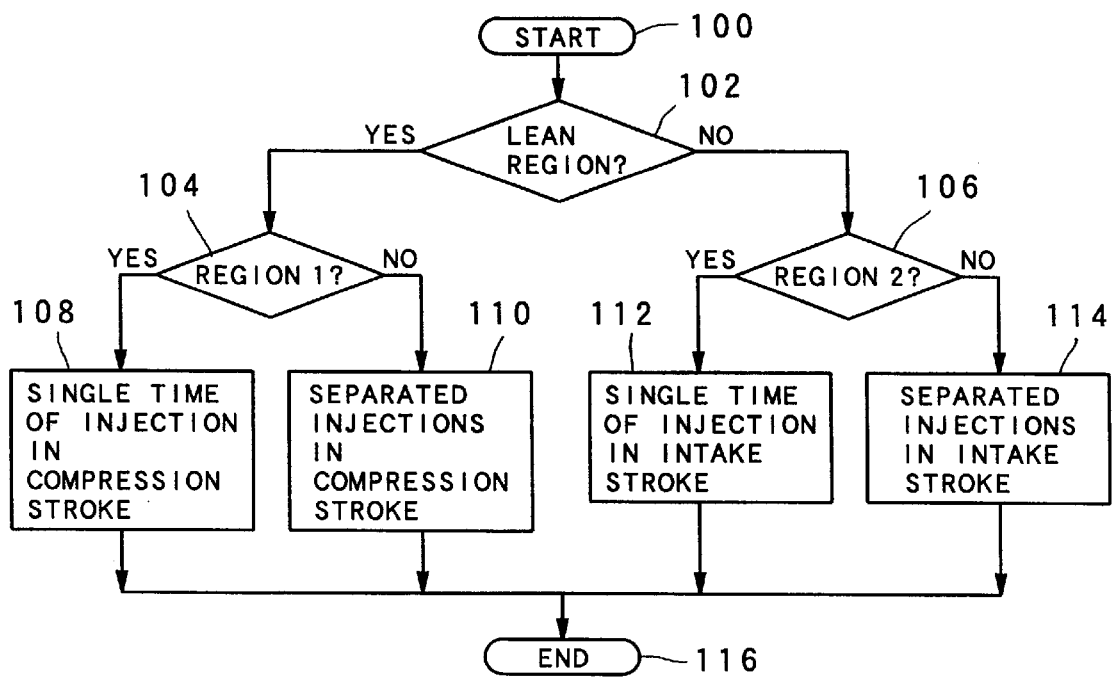
FIG. 1 is a flow chart showing control procedures for a cylinder injection system engine according to an embodiment of the present invention.

The operation of the present embodiment will now be described with reference to the control flow chart in FIG. 1.

When a control program stored in the control means 30 by conventional electronic storage starts at step (100), then a determination (102) is made as to whether an operating state of the engine 2 lies within a lean region, i.e. lean fuel to air ratio. When the determination (102) results in "YES", then a further determination (104) is made as to whether the operating state falls within region 1. However, when the determination (102) results in "NO", then another determination (106) is made as to whether the operating state falls within region 2.

When the determination (104) is "YES", then a single time of injection in each compression stroke (108) is executed. Thereafter, the program is put to an end (116). When the determination (104) is "NO", i.e., when the operating state lies in region 3, then separated injections, i.e. subtimes of injection, in each compression stroke (110) are executed. Thereafter, the program is brought to the end (116).

When the above determination (106), which is made as to whether the operating state falls in region 2 within a theoretical air-fuel ratio, is "YES", then a single time of injection in each intake stroke (112) is executed. Thereafter, the program advances to the end (116). When the determination (106) is "NO", i.e., when the operating state lies in region 4, then separated injections, i.e. subtimes of injection, in each intake stroke (114) are executed. Thereafter, the program is brought to the end (116).

Figure 11:
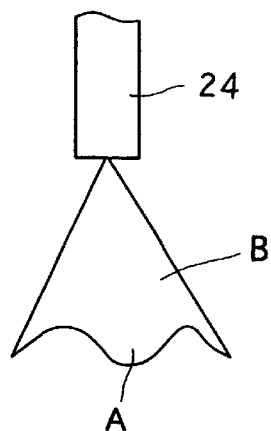
FIG. 11 is a schematic view showing a swirl type injector.

Referring now to FIG. 11, a swirl type of injector 24, which is in widespread use, is shown spraying fuel in the form of a hollow cone. The injector 24 is provided with a swirler for imparting swirling components to a spray of fuel, and fuel present at the downstream side of the swirler is discharged as initial spray "A". Such initial spray "A" has a constant amount, independent of the injection time period. Accordingly, the separated injections increase a ratio of initial spray "A" to the entire injection quantity for each injection time period. With such an increased ratio of initial spray "A", the fuel injection during the compression stroke causes an angle of spray to be formed smaller than when initial spray "A" is absent. This causes a rise in an apparent factor of flow rate at a nozzle hole of the injector 24, and an increase in the injection quantity. In addition, even with the intake stroke injection without such an operation as above, the fuel present on the downstream side of the swirler is ejected as initial spray "A" uninterruptedly. Thus, in the separated injections that bring about a large amount of initial spray "A", the injection quantity is increased. Note that reference character "B" denotes a surface section of the spray cone.

Thus, the control means 30 allows the injection timing of the fuel from the injector 24 to be divided into several injection times according to predetermined engine conditions. As a result, the promoted fuel atomization enables a reduction in the injection period, with a consequential increase in a fuel economy. This is advantageous from economical and efficiency viewpoints.

In addition, the control means 30 executes control so as to provide such separated injection timing during the high engine rotational speed or the high engine load in the compression stroke injection. As a result, accelerated fuel atomization, a shorter injection period, an extended lean operation region, and increased fuel efficiency are all achievable. This is advantageous from economical and efficiency standpoints.

Further, the control means 30 executes control so as to provide the separated injection timing during the high engine rotational speed or the high engine load in the intake stroke injection. As a result, a reduced injection period is achievable; and the injection period during the high rotation speed or the high engine load is ensured.

Figure 12:
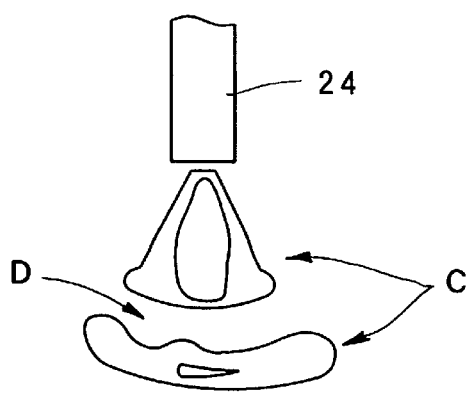
FIG. 12 is a schematic view showing an injector with mixture zones.

Moreover, the fuel from the injector 24 is injected according to the separated injection timing that has been divided into several injection times at given time intervals therebetween. Then, in the injection timing to practice fuel atomization, air layer "D" is provided between mixture zones "C" that are formed by particulate fuel or atomized fuel, as illustrated in FIG. 12. As a result, each of the mixture zones "C" occupies a large surface area, and thus provides a wide contact area touching surrounding air and air layers. Accordingly, rapid atomization is promoted, which results in enhanced fuel efficiency. This is advantageous from an economical viewpoint.

As amplified in the above description, the present invention provides a cylinder fuel injection system in an internal combustion engine, including an injector for injecting fuel directly into a combustion chamber, and further including control means for controlling injection timing of fuel from the injector, the improvement wherein the control means divides the aforesaid injection timing into a number of subtimes according to predetermined conditions of the engine, e.g. condition of crank angle sensor, air/fuel sensor, fuel pressure sensor, throttle valve sensor, air flow sensor, etc. In addition, accelerated injected fuel atomization can reduce the overall fuel injection time period. Moreover, the fuel from the injector is injected according to the separated injection timing that has been divided into several times of injection with certain time intervals therebetween. Then, in the injection timing to practice fuel atomization, an air layer is provided between mixture zones that are formed by particulate fuel or atomized fuel. As a result, each of the mixture zones has a large surface area of fuel to air contact, and thus provides a wide fuel contact area in touch with surrounding air and air layers. Accordingly, rapid atomization is promoted, which results in an enhanced fuel economy.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In a cylinder injection system engine including an injector for injecting fuel directly into a combustion chamber, the chamber being formed in the engine by a cylinder block, a cylinder head, and a piston, and further including a control means for controlling injection timing of fuel from said injector, the improvement wherein said control means has means for dividing the injection timing into several times of injection timing according to predetermined conditions of said engine and during one of a high rotational speed and a high load during compression stroke injection.

2. In a cylinder injection system engine including an injector for injecting fuel directly into a combustion chamber, the chamber being formed in the engine by a cylinder block, a cylinder head, and a piston, and further including a control means for controlling injection timing of fuel from said injector, the improvement wherein said control means has means for dividing the injection timing into several times of injection timing according to predetermined conditions of said engine and during one of a high rotational speed and a high load during intake stroke injection.

3. A method for controlling fuel injection in an engine, comprising the steps of:

determining if the engine is running on a lean fuel to air mixture;

determining if the engine is in a region of low load and low rotational speed; and separating a single continuous fuel injection into several fuel injections during one of high engine rotation and high load.

* * * * *